Patented Feb. 24, 1953

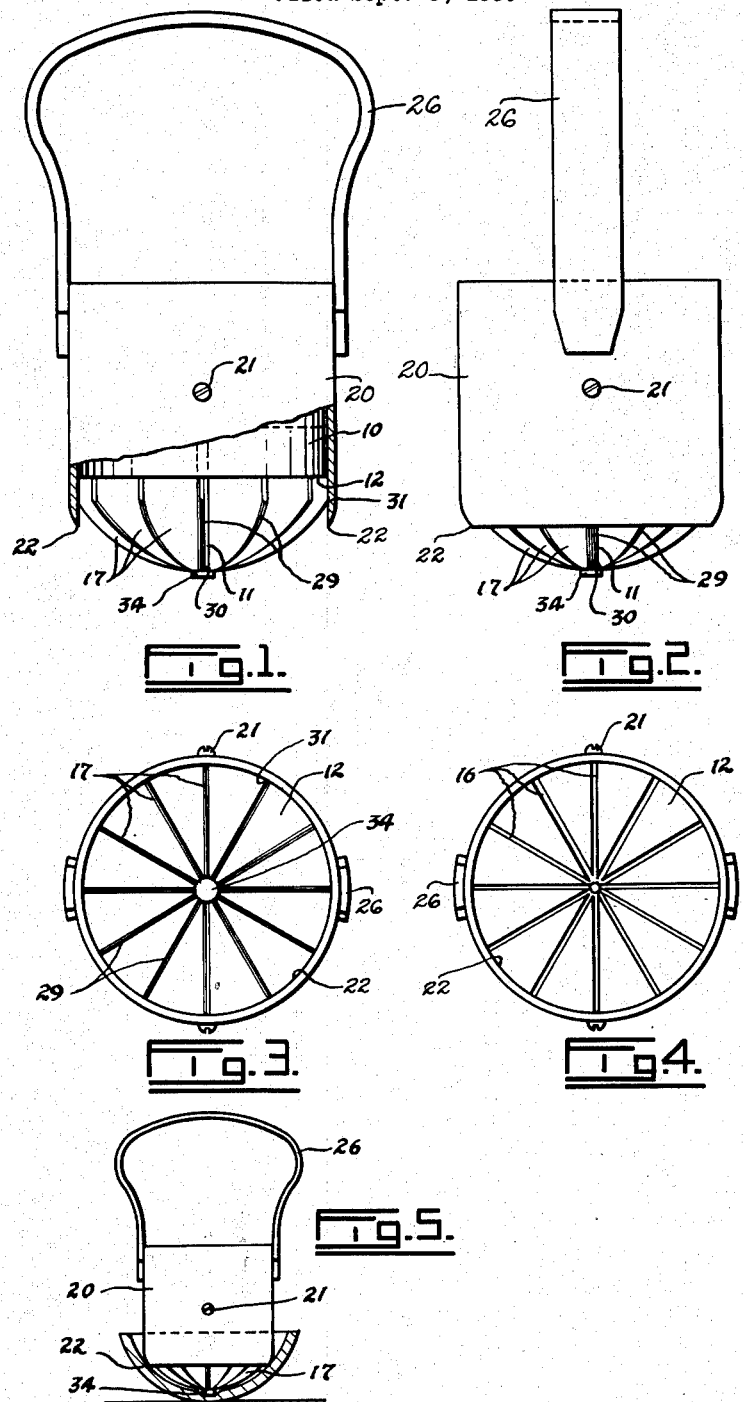

2,629,168

UNITED STATES PATENT OFFICE 2,629,168

FRUIT QUARTERING DEVICE

Pete Shpentuk, Vancouver, British Columbia, Canada

Application September 5, 1950, Serial No. 183,153

2 Claims. (Cl. 30—24)

This invention relates to a device for quartering fruit, and particularly grapefruit and oranges.

For the sake of clarity, this invention will be described in connection with grapefruit, but it is to be understood that it may be used for oranges or other fruit to be quartered. When a grapefruit is to be eaten, it is cut in two and then it is usually quartered to make it easier to get the pulp sections out of the skin. In the home and in most restaurants, the quartering is usually done with a sharp knife. This is a slow and not too satisfactory method of doing it.

The present device is designed to quarter the grapefruit in one simple operation. The device includes a plurality of radiating blades projecting from one end with the cutting edges thereof curving outwardly and upwardly from the centre of the device. These blades may be pressed into the pulp of the fruit until they reach the fruit skin to quarter said pulp. The device may also include a cylindrical casing from one end of which the radiating blades project. The lower edge of this casing may be sharpened so that as the blades are pressed through the fruit pulp, the casing cuts its way through the pulp adjacent the skin at the top of the latter. This severs the pulp from the skin all the way around said skin near the top thereof. Another advantage of this device lies in the fact that it is provided with a stop which projects slightly beyond the cutting edges of the radiating blades at the centre thereof which prevents said blades from going through the skin.

An example of this invention is illustrated in the accompanying drawings, in which, Figure 1 is an elevation of the quartering device, with parts thereof broken away, Figure 2 is an elevation of the device taken substantially at right angles to Figure 1, Figure 3 is a bottom plan view of the complete device, Figure 4 is a bottom plan view with the radiating blades removed, and Figure 5 diagrammatically illustrates the device in use on a grapefruit.

Referring to the drawings, 10 is a base which is preferably circular in cross section. A pin 11 projects outwardly from the end 12 of the base centrally thereof. The base has a plurality of radiating grooves 16 formed in its lower surface, see Figure 4, and a blade 17 fits into each of these grooves, see Figures 1 and 2. With this arrangement, a plurality of blades 17 project from the end of the base and radiate from the centre thereof to its outer edge. Actually, these blades radiate from the pin 11. The blades may be held in their grooves in any suitable manner.

It is preferable, although not absolutely necessary, to provide a cylindrical casing 20 into which the base 10 fits and is secured in any convenient manner such as by screws 21 extending through the casing into the base. One end of the casing extends beyond the end 12 of the base and overlaps a portion of the radiating blades 17. One end of the casing, the end overlapping the blades, may be sharpened to form a circular cutting edge 22 extending around the blades. If desired, a handle 26 may be secured to the opposite end of the casing or the base.

Each blade 17 is sharpened at its lower edge to form a cutting edge 29 which curves in a radial direction from the inner end 30 of the blade back to the casing wall at 31. It is preferable to have the point 31 where each blade comes into contact with the casing wall spaced from the cutting edge 22 of the latter, as clearly shown in Figure 1.

The pin 11 is located on the axis of the cylindrical casing, and the blades 17 radiate from said axis to the casing wall. The cutting edge of each blade curves from a point spaced below the casing up to a point within the casing just above the cutting edge of the latter.

A stop 34 located at the centre of the radiating blades extends slightly below the cutting edges thereof. This stop may be in the form of a substantially flat head positioned on the outer end of the pin 11. As well as acting as a stop, this head may help to retain the blades 17 in position.

When it is desired to quarter a half grapefruit, the device is grasped by the handle 26 and after it is centred over the grapefruit, it is pressed downwardly. During the first part of this action, the blades 17 quarter the pulp of the fruit. When the stop 34 contacts the fruit skin, it stops the movement of the device. During the latter part of this movement, the cutting edge 22 of the casing 20 has cut down into the pulp around the top of the skin, as clearly shown in the diagram of Figure 5. This severs the fruit from the skin all the way around at the top of the latter, so that it is now possible to insert a spoon between the pulp and skin without any difficulty. If the spoon is inserted beneath a quarter, it is now very easy to press the spoon further along the inner surface of the skin since the quarter has been severed from the pulp on each side of it. Thus, in order to quarter the fruit and make it ready for eating, it is only necessary to press the device downwardly within the skin until the stop engages the bottom thereof. The one cutting action severs most of the pulp away from the skin. As the person using the device does not have to worry unduly about the blades cutting through the skin, he can press it firmly so as to obtain clean cuts.

One of these quartering devices will cut fruit of different sizes. However, it may be necessary to have one size for normal grapefruit, and another size for small grapefruit and oranges.

What I claim as my invention is:

1. A quartering device particularly for grapefruit and oranges comprising a cylindrical casing having an annular cutting edge formed on one end thereof, a base within the casing having an end spaced inwardly from the cutting edge thereof, a plurality of grooves in said base end radiating from the centre to its outer edge, and a blade fitting in each groove and projecting beyond the casing cutting edge, each blade having a cutting edge curving in a radial direction from its inner end back to the casing wall spaced from the cutting edge of the latter.

2. A quartering device particularly for grapefruit and oranges comprising a cylindrical casing having an annular cutting edge formed on one end thereof, a base within the casing having an end spaced inwardly from the cutting edge thereof, a pin projecting outwardly from the base centrally thereof, a plurality of grooves in said base end radiating from the centre to its outer edge, a blade fitting in each groove against the pin and projecting beyond the casing cutting edge, each blade having a cutting edge curving in a radial direction from its inner end back to the casing wall spaced from the cutting edge of the latter, and flat head on the outer end of the pin extending slightly beyond the cutting edges of the blade, said head overlapping the blades to retain them in their grooves.

PETE SHPENTUK.

REFERENCES CITED

The following references are of record in the file of this patent:

UNITED STATES PATENTS

| Number | Name | Date |
|---|---|---|
| 921,917 | Troxell | May 18, 1909 |
| 1,466,114 | Buchi | Aug. 28, 1923 |
| 2,402,558 | La Berge | June 25, 1946 |
| 2,458,215 | Sparks | Jan. 4, 1949 |
| 2,468,282 | Wood | Apr. 26, 1949 |